United States Patent
Cavalcanti et al.

(10) Patent No.: US 10,939,299 B2
(45) Date of Patent: Mar. 2, 2021

(54) SELF-COEXISTENCE OF DEVICES IN A FLEXIBLE WIRELESS SYSTEM INCLUDING TWO OR MORE WIRELESS NETWORKS THAT SHARE A FREQUENCY BAND

(75) Inventors: Dave Alberto Tavares Cavalcanti, Ossining, NY (US); Jianfeng Wang, Ossining, NY (US)

(73) Assignee: Koninklijke Philips N.V., Eindhoven (NL)

(*) Notice: Subject to any disclaimer, the term of this patent is extended or adjusted under 35 U.S.C. 154(b) by 321 days.

(21) Appl. No.: 13/141,495

(22) PCT Filed: Dec. 9, 2009

(86) PCT No.: PCT/IB2009/055602
§ 371 (c)(1),
(2), (4) Date: Jun. 22, 2011

(87) PCT Pub. No.: WO2010/073168
PCT Pub. Date: Jul. 1, 2010

(65) Prior Publication Data
US 2011/0255500 A1    Oct. 20, 2011

Related U.S. Application Data

(60) Provisional application No. 61/140,096, filed on Dec. 23, 2008.

(51) Int. Cl.
*H04W 16/14* (2009.01)
*H04W 88/08* (2009.01)

(52) U.S. Cl.
CPC .......... *H04W 16/14* (2013.01); *H04W 88/085* (2013.01)

(58) Field of Classification Search
CPC ............................ H04W 16/14; H04W 88/085
See application file for complete search history.

(56) References Cited

U.S. PATENT DOCUMENTS

| 5,953,671 A | * | 9/1999 | Childress .............. H04W 84/08 455/512 |
| 7,184,767 B2 | | 2/2007 | Gandolfo |

(Continued)

FOREIGN PATENT DOCUMENTS

| WO | WO0197447 A2 | 12/2001 |
| WO | WO2007031960 A2 | 3/2007 |

(Continued)

OTHER PUBLICATIONS

Carlos Cordeiro et al., "C-MAC: A Cognitive MAC Protocol for Multi-Channel Wireless Networks", New Frontiers in Dynamic Spectrum Access Networks, 2007. DYSPAN 2007. 2nd IEEE International Symposium on, IEEE, PI, Apr. 1, 2007 (Apr. 1, 2007), pp. 147-157, XP031095614.

(Continued)

*Primary Examiner* — Gregory B Sefcheck
*Assistant Examiner* — Joshua Smith

(57) ABSTRACT

A method (300) for enabling self-coexistence of devices in a flexible wireless system (200) that includes first and second wireless networks sharing a frequency band. The method includes discovering a second device operable in the second wireless network that overlaps with the first wireless network (S310); reporting the discovered second device to a first device operable in the first wireless network (S320); determining if an adjustment is needed between a first beacon period of the first device and a second beacon period of the second device (S330); and adjusting a first beacon period start time (BPST) of the first device with a second BPST of the second device (S370) if the adjustment is needed.

19 Claims, 5 Drawing Sheets

(56) References Cited

U.S. PATENT DOCUMENTS

| | | |
|---|---|---|
| 8,335,548 B2 | 12/2012 | Kuwana |
| 2002/0072382 A1* | 6/2002 | Fong et al. .................... 455/507 |
| 2004/0184423 A1* | 9/2004 | Tiedmann et al. ........... 370/331 |
| 2005/0054357 A1* | 3/2005 | Takiishi .............. H04W 74/085 455/502 |
| 2005/0068934 A1* | 3/2005 | Sakoda ................ H04W 48/08 370/350 |
| 2005/0078707 A1* | 4/2005 | Maltsev et al. ............... 370/471 |
| 2005/0233789 A1* | 10/2005 | Maekawa .............. H04L 12/12 463/1 |
| 2005/0249167 A1* | 11/2005 | Salokannel ................... 370/336 |
| 2006/0040701 A1* | 2/2006 | Long .................... H04W 48/12 455/525 |
| 2006/0245440 A1 | 11/2006 | Mizukoshi |
| 2006/0268800 A1 | 11/2006 | Sugaya |
| 2007/0274206 A1* | 11/2007 | Habetha et al. ............. 370/222 |
| 2007/0286227 A1* | 12/2007 | Koezuka ................ H04L 12/66 370/445 |
| 2008/0051090 A1* | 2/2008 | Kobayashi ........... H04W 36/06 455/436 |
| 2008/0107015 A1* | 5/2008 | Cho et al. ..................... 370/216 |
| 2008/0112384 A1* | 5/2008 | Seo et al. ...................... 370/343 |
| 2008/0228878 A1* | 9/2008 | Wu .................... H04W 72/121 709/205 |
| 2008/0259895 A1* | 10/2008 | Habetha et al. ............. 370/345 |
| 2008/0268886 A1* | 10/2008 | Sim et al. ..................... 455/500 |
| 2008/0279214 A1* | 11/2008 | Doi et al. ..................... 370/459 |
| 2008/0298329 A1* | 12/2008 | Mo ....................... H04W 84/18 370/338 |
| 2008/0316966 A1* | 12/2008 | Joshi .................... H04W 74/02 370/330 |
| 2009/0285213 A1* | 11/2009 | Chen .................... H04W 40/28 370/392 |
| 2010/0142443 A1* | 6/2010 | Chou et al. ................... 370/328 |
| 2010/0260085 A1* | 10/2010 | Wang et al. .................. 370/311 |
| 2010/0271948 A1* | 10/2010 | Challapali et al. ........... 370/235 |
| 2010/0290387 A1* | 11/2010 | Chou et al. ................... 370/328 |
| 2010/0304772 A1* | 12/2010 | Wang et al. .................. 455/509 |

FOREIGN PATENT DOCUMENTS

| | | |
|---|---|---|
| WO | WO2007083257 A1 | 7/2007 |
| WO | WO 2008087587 A1 * | 7/2008 |

OTHER PUBLICATIONS

Cavalcante et al., "IEEE 802.22-07/0369r1, IEEE 802.22 Working Group on Wireless Regional Area Networks", IEEE, Jul. 2007.

Cordeiro et al., "A Beacon-based Proposal to IEEE 802.22.1,IEEE 802.22-06/0130r0,IEEE 802.22 Working Group on Wireless Regional Area Networks", IEEE, Jul. 2006.

\* cited by examiner

SELF-COEXISTENCE OF DEVICES IN A FLEXIBLE WIRELESS SYSTEM INCLUDING TWO OR MORE WIRELESS NETWORKS THAT SHARE A FREQUENCY BAND

This application claims the benefit of U.S. Provisional Application No. 61/140,096 filed on Dec. 23, 2008.

The invention generally relates to wireless communication networks and, more particularly, to self-coexistence of devices in such networks.

With the emergence of unlicensed wireless services, operation of multiple neighboring, wireless networks—whether overlapping or not—sharing the same unlicensed frequency spectrum has become commonplace. One of the problems associated with supporting the unlicensed wireless services is to enable neighboring wireless systems using the same Medium Access Control (MAC) protocol to harmoniously share the same frequency band while guaranteeing quality of service (QoS). This problem is known in the related art as self-coexistence. Coexistence of devices in a wireless system occurs when devices using different MAC/physical (PHY) protocols (e.g., IEEE802.11 and Bluetooth) share the same medium without interfering with each other.

The difference between self-coexistence and coexistence is as follows: the same MAC is used in self-coexistence, while different MACs are used in coexistence. Current solutions do not distinguish between self-coexistence and coexistence, i.e., provide the same solution for both situations.

Current coexistence and self-coexistence solutions are designed for systems that operate in either centralized or distributed mode. In a distributed mode, a distributed MAC protocol is employed, and no device has an absolute control over the wireless medium. In such mode, the distributed reservation protocol (DRP) mechanism is a channel reservation and coexistence solution adopted by the ECMA International Standard 368 published in High Rate Ultra Wideband PHY and MAC Standard, 1st Edition December 2005. The DRP is operable only in wireless systems where all devices act as peers, thus having similar capabilities.

In a centralized operation mode, a single coordinator device controls the access to the channel among the devices. An example of a centralized coexistence solution is the coexistence beacon protocol (CBP), defined in the IEEE 802.22 WRAN draft specification, in which the protocol operation is completely controlled by base stations (BS).

A flexible MAC (Flex-MAC) protocol is designed to support both centralized and distributed modes and to enable a smooth transition from one operation mode to another. That is, a Flex-MAC typically enables the devices to switch from a distributed to centralized operation mode (and vice versa) without interrupting ongoing connections.

The Flex-MAC is based on a flexible superframe 100, depicted in FIG. 1. The superframe 100 includes a beacon period (BP) 110, a data/sense/sleep period (DSSP) 120, and a signaling window (SW) 130. The time periods of the signaling window 130 and beacon period 110 are adjustable and used for broadcasting/exchanging control information. All devices should keep awake during the beacon period 110 and signaling window 130 in order to capture the control/management information, which may apply to every device in the network. A device may exchange data, monitor the channel (needed in cognitive networks), or enter a sleep mode during the DSSP 120.

Access of devices to the medium or channel may be performed by a channel reservation protocol (CRP). This protocol is based on a negotiation process between an owner device and a proxy device, which grants the reservation. The CRP together with the Flex-MAC provide a framework to enable coexistence and guarantee QoS in wireless systems sharing the same unlicensed frequency bands. However, the Flex-MAC does not include all techniques necessary for efficient self-coexistence of devices in the wireless systems.

Certain exemplary embodiments of the invention include a method for enabling self-coexistence of devices in a flexible wireless system that includes first and second wireless networks sharing a frequency band. The method comprises discovering a second device operable in the second wireless network that overlaps with the first wireless network; reporting the discovered second device to a first device operable in the first wireless network; determining if an adjustment is needed between a first beacon period of the first device and a second beacon period of the second device; and adjusting a first beacon period start time (BPST) of the first device with a second BPST of the second device if the adjustment is needed.

Certain exemplary embodiments of the invention also include a network device operable in self-coexistence with network devices in a flexible wireless system that includes first and second wireless networks sharing a frequency band. The network device comprises a detection unit for discovering a second device operable in the second wireless network that overlaps with the first wireless network; an information element generator for reporting the discovered second device to other network devices operable in the first wireless network; a decision unit for determining if an adjustment is needed between a beacon period of the network device and a second beacon period of the second device; and a beacon period start time (BPST) adjustment unit for adjusting a BPST of the network device with a second BPST of the second device if the adjustment is needed.

The subject matter that is regarded as the invention is particularly pointed out and distinctly claimed in the claims at the conclusion of the specification. The foregoing and other features and advantages of the invention will be apparent from the following detailed description taken in conjunction with the accompanying drawings.

Figure 1:
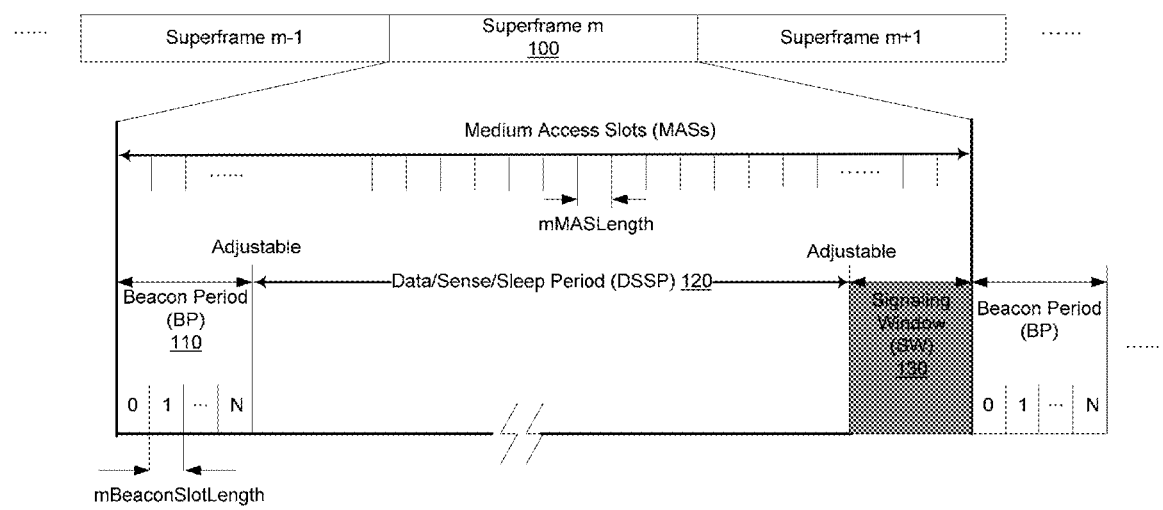
FIG. 1 is a diagram for illustrating the structure of a Flex-MAC superframe.

It is important to note that the embodiments disclosed by the invention are only examples of the many advantageous uses of the innovative teachings herein. In general, statements made in the specification of the present application do not necessarily limit any of the various claimed inventions. Moreover, some statements may apply to some inventive features but not to others. In general, unless otherwise indicated, singular elements may be in plural and vice versa with no loss of generality. In the drawings, like numerals refer to like parts through several views.

Figure 2:
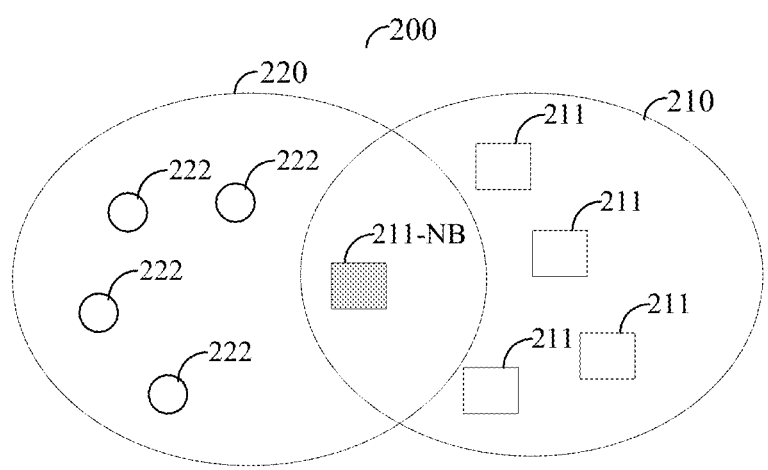
FIG. 2 is a diagram of a wireless system in accordance with various embodiments of the present invention.

FIG. 2 shows an exemplary diagram of a wireless system 200 in accordance with various embodiments of the invention. The wireless system 200 is a flexible wireless system that includes two distinct and overlapping wireless networks 210 and 220. Both networks employ the Flex-MAC protocol and share the same unlicensed frequency band. In the context of the present invention, self-coexistence of devices in a flexible wireless system is referred to as devices belonging to different networks and communicating using the Flex-MAC protocol over a shared medium, i.e., unlicensed frequency band.

Devices 211 of the network 210 and devices 222 of the network 220 can operate in a distributed or centralized mode. That is, three different configurations exist in the wireless system 200: centralized-centralized, distributed-distributed and centralized-distributed. It should be noted that when a network operates in a centralized mode, one of the devices 211 or 222 is a master device. In addition, each of the devices 211 or 222 may be a beaconing device, i.e., a device that transmits beacons during the beacon period 110.

Certain embodiments described herein enable efficient self-coexistence of networks 210 and 220 in the three configurations listed above, thereby enabling devices 211 and 222 to harmoniously share the same frequency band while supporting QoS for their users. It should be noted that although only two networks 210 and 220 are illustrated in FIG. 2, the invention can support self-coexistence in a flexible wireless system that includes any number of networks and/or subnets.

Figure 3:
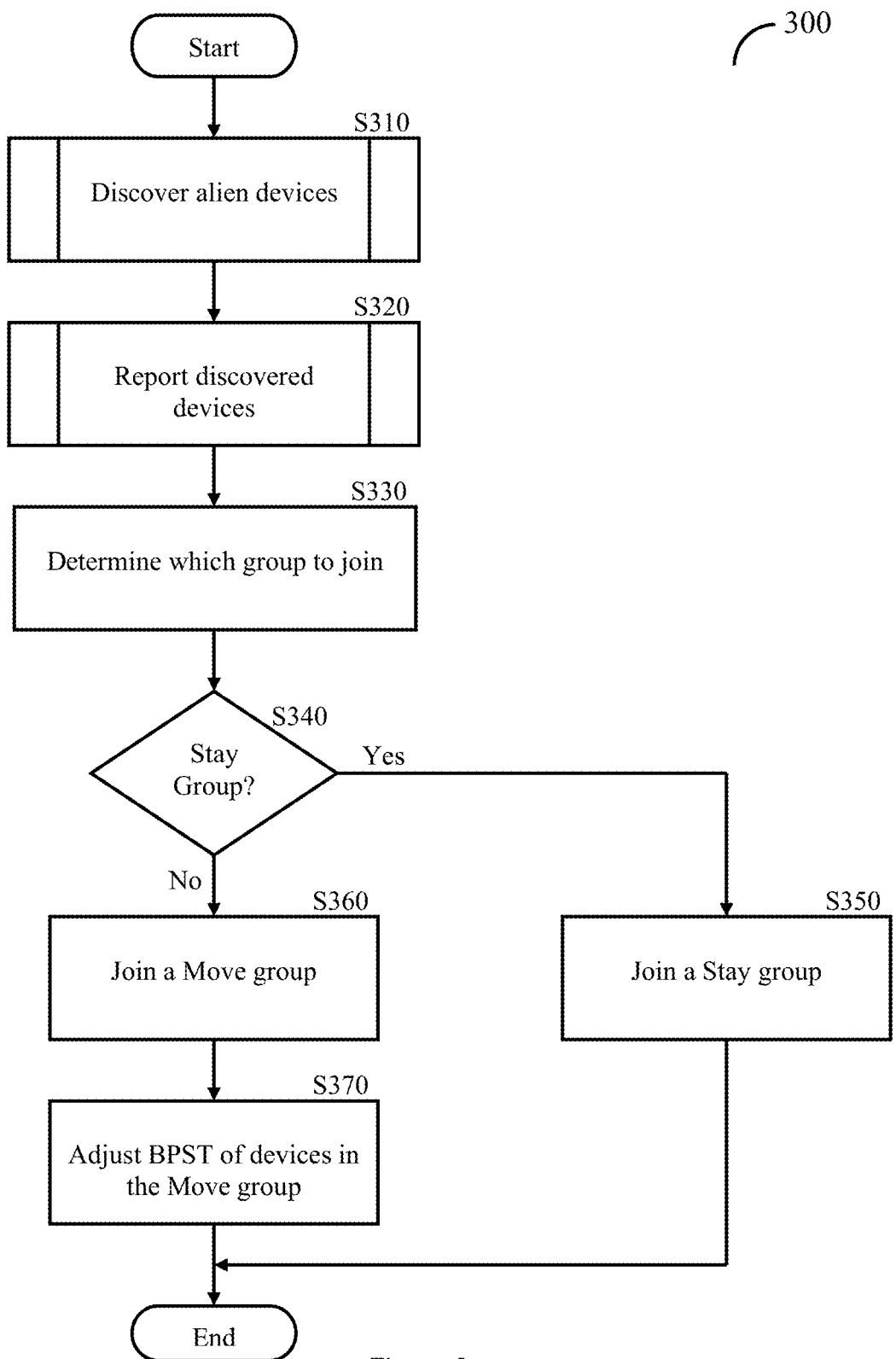
FIG. 3 is a flowchart for describing the self-coexistence method in accordance with an embodiment of the invention.

FIG. 3 shows an exemplary and non-limiting flowchart 300 describing a method for enabling self-coexistence of devices in a flexible wireless system (e.g., system 200), implemented in accordance with an embodiment of the invention. At S310 a discovery procedure is applied to detect overlapping networks (e.g., networks 210 and 220). The discovery procedure allows a device to discover an alien group of devices, i.e., one or more devices sharing the wireless medium (e.g., frequency band) as the discovering device, but belonging to a different network (or subnet). A group of devices is defined by a network address or any other network identifier (NetID) that is shared by all devices in the group. The discovery is performed using beacons and/or frames (such as control, management, or data frames) received or overheard by the discovering device. Typically, a beacon, control or data frame includes a NetID of the group. Thus, by receiving a beacon, control or data frame including an unknown NetID, the discovering device concludes that an alien group of devices exists in the wireless system. It should be noted that if no overlapping networks are detected by any of the devices in the wireless system, execution may terminate.

At S320, a report procedure is applied allowing the discovering device to announce a newly discovered alien group of devices to all devices in the network of the discovering device. The reporting is facilitated by a report information element (IE) that comprises at least a NetID or a network address of the discovered alien group of devices. The report IE may also include channel reservations owned by the devices in the group or any other type of information that can be used to allow efficient self-coexistence of devices. The report IE is transmitted by a discovering device during a beacon period 110 or a signaling window 130 depending on the type of discovering device. Specifically, if the discovering device is a beaconing device the report IE is transmitted in a beacon period 110; otherwise, the report IE is sent in a signaling window 130.

At S330 through S370, a procedure for merging beacon periods of devices belonging to different and distinct groups is applied. Each discovering device decides whether or not to adjust its beacon period with the device(s) in the alien group. In order to enable self-coexistence, devices belonging to different groups or networks should have the same beacon period start time (BPST) to synchronize transmission of superframes. Merging of beacon periods includes at least one group of devices adjusting their BPSTs and the superframe numbers to align with another group BPST and superframe number. The merging procedure is accomplished by categorizing devices into two groups: Move and Stay. The former group includes devices that should change their BPSTs and superframe numbers, and the latter is of devices that should not make any adjustments.

At S330 each discovering device determines whether it belongs to a Stay or Move group. The determination is made based on information received in beacons and/or a report IE and using a predefined set of rules. These rules define the attributes of a Stay group based on the configuration of the wireless system 200. Specifically, if the wireless system 200 operates in a distributed-distributed configuration, the Stay group is defined to include a group of devices having a largest number of reserved slots, a largest beacon period length, or a largest superframe number, in that order of priority. It should be appreciated that the criteria set by this rule allows for minimizing the control overhead involved in adjusting the BPSTs. When devices adjust their BPSTs, ongoing reservations should also adjusted, which involves more overhead. Thus, a higher priority is given to the group of devices with more active reservations to be in a Stay group.

When the wireless system 200 is configured to operate in a centralized-centralized mode, a Stay group is defined to include either a master device with a largest number of slave devices with active reservations, or a master device with a largest number of reserved slots (including slots granted to its slaves) in that order of priority. If such a master device is not found, the following criteria are used in order of priority: devices with a largest overall number of reserved slots in the group, a largest beacon period length, or a largest superframe number included in the Stay group. When devices operate in the centralized mode, only the master device may have to adjust its BPST. The master device must also inform its slave devices of any changes in the superframe number and update the reservations under his control, i.e., reservations it has granted to its slaves. This process involves explicit exchange of control/management frames during the signaling window 130, which imposes a higher overhead than adjusting reservations in the implicit mode. Therefore, a master device with more active slave devices is given a higher priority to be in the Stay group, as it would reduce the overall overhead involved in the merging beacon periods.

When the wireless system 200 operates in a centralized-distributed mode, a Stay group is defined to include slave devices operating in a centralized mode with active reservation. If a master device (in the centralized network) has no slave devices with active reservations, the following criteria are used, in that order of priority, to define the devices that should be part of a Stay group: devices with a largest overall number of reserved slots in the group, a largest beacon period length, or a largest superframe number. The highest priority is given to a group of devices operating in a centralized mode with active reservations.

At S340, based on the above rules it is checked if the discovering device should join the Stay group, and if so, at S350, the device is added to this group; otherwise, at S360 the device joins to the Move group. It should be noted that S330 through S360 are repeated for all discovering devices in the wireless system 200. At the completion of steps S350 and S360, two groups of devices are formed, where devices in the Move group should change their BPSTs and superframe number to align with devices in the Stay group.

At S370 each device in the Move group adjusts its BPST to synchronize with a beacon period of an alien device. A beaconing device which is not a master device can change its BPST as described, for example, in the ECMA 368 MAC standard referenced above. Briefly, according to the ECMA 368 MAC, a device relocates its beacon period to the alien beacon period by changing its BPST to the BPST of the alien device. This includes adjusting a beacon slot number to a new beacon slot number being computed as follows:

NewBeaconSlotNo=OldBeaconSlotNo+1+(HighestOccupiedBeaconSlotNo−mSignalSlotCount)

The number of the highest occupied beacon slot is indicated in a beacon received in the alien beacon period, where the mSignalSlotCount is the number of signaling slots in a super frame. The signaling slots are beacon slots of a beacon period that are used to extend the beacon period length of neighbors. Once the device has changed its BPST, it should not send further beacons in its previous beacon period.

The BPST adjustment of a master device and its respective slave devices is performed as follows. A master device notifies its slave devices of the proposed change to the BPST. This can be performed using a beacon switch IE transmitted in a beacon. The master device also starts a timer (hereinafter BP_switch_timer) when it sends the first beacon switch IE advertising its decision to switch its BPST. Each slave device replies with an acknowledgment (ACK) message acknowledging the change to a new BPST. Upon receiving an ACK message from all slave devices or once the BP_switch_timer expires, the master device switches to the new BPST. Thereafter, the master device updates any existing reservation if a conflict after switching to the new BPST is detected.

Once the merging procedure is completed, all the devices in the Stay and Move groups have the same BPST, thereby communicating using the same superframe having the same superframe number.

The communication between two or more distinct groups of devices (or devices in overlapping networks) can be performed using a beaconing device. For example, in the wireless system 200 only a device 222—non-beaconing (NB) can discover the existence of devices 211 in network 210 (see FIG. 2). However, if the device 222-NB is a non-beaconing device it cannot notify the other devices 222 in the network 220 of its discovery. Such a case is feasible if the network 220 merely operates in a centralized mode where only the master device is a beaconing device. To resolve this, a beaconing device promotion procedure is provided in accordance with an embodiment of the invention. Using this procedure a master device in a centralized network can promote a slave device to become a beaconing device.

Figure 4:
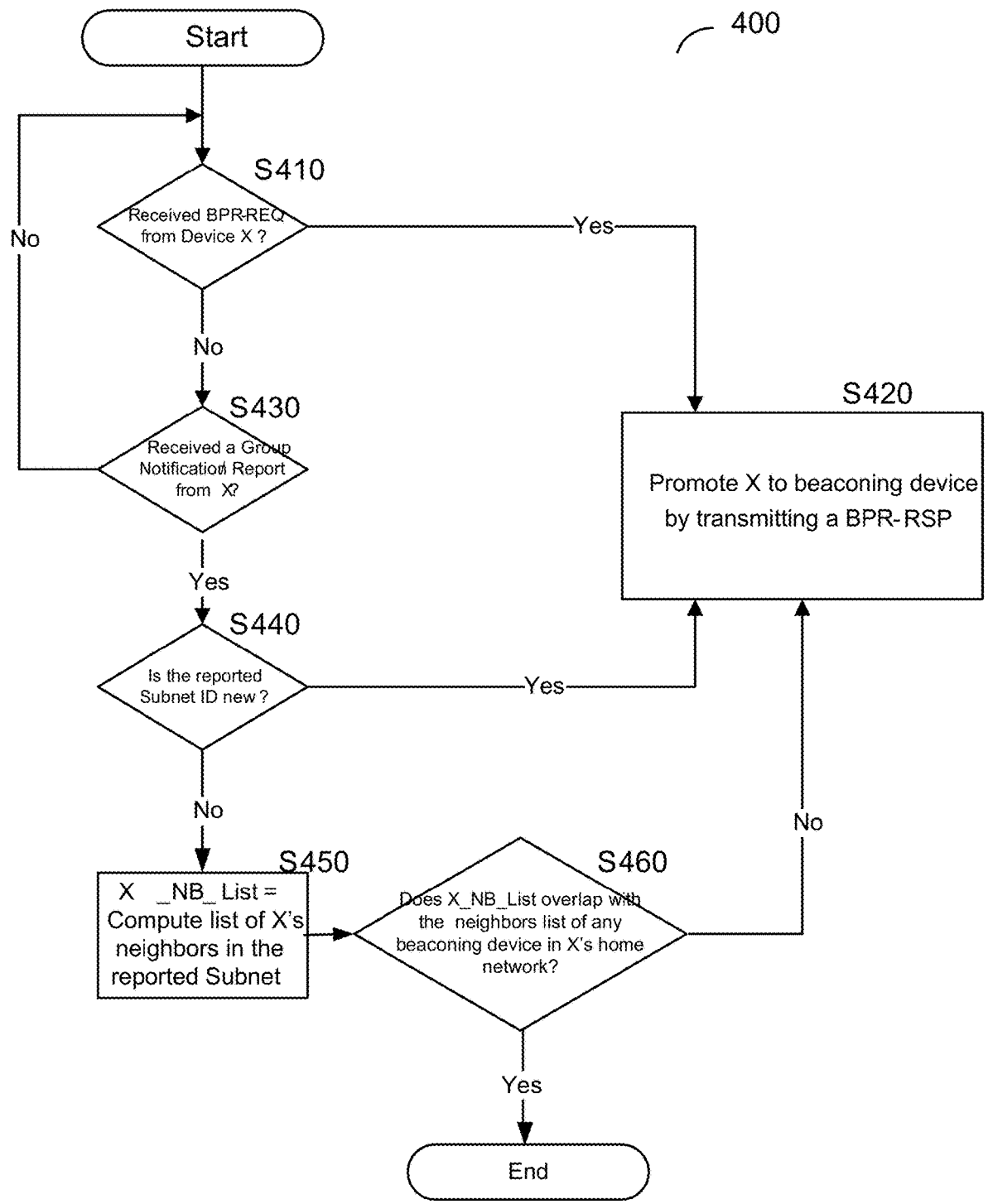
FIG. 4 is a flowchart for describing the beaconing device promotion method in accordance with an embodiment of the invention.

FIG. 4 shows a non-limiting and exemplary flowchart 400 illustrating the beaconing device promotion procedure. This procedure by the master device is initiated by a slave device that detects an alien group of devices. At S410, a master device checks if a beaconing promotion request (hereinafter BPR-REQ) is received. The BPR-REQ is sent by a slave device when the device should start a reservation process with a target device in the alien group of devices. If S410 results in affirmative answer, execution continues with S420 when the master device transmits a beaconing promotion response (hereinafter BPR-RSP) to promote the slave device to become a beaconing device. In one embodiment, the BPR-RSP includes a response code field indicating whether the slave device is promoted. If promoted the slave device starts the process of sending beacons in the next beacon period.

Otherwise, at S430 a check is made to determine if a report IE was sent by a slave device informing the master device of the existence of an alien group of devices. If so, execution proceeds to S440 where another check is performed to determine if the reported alien group of devices is a new group; otherwise, execution returns to S410.

If S440 results in affirmative answer, execution continues with S420; otherwise, at S450 a list of neighboring devices of the slave device in the reported alien group of devices is computed. Then, at S460 it is checked if the neighboring devices in the alien group newly discovered by the slave device are contained in the neighboring device list of any beaconing device (master or slaves) in the network (or subnet) of the slave device. If there is at least one device listed in both of these lists, then execution ends. In this case, there is at least another device in the network that can communicate with the discovered alien group of devices; otherwise, execution proceeds to S420.

Figure 5:
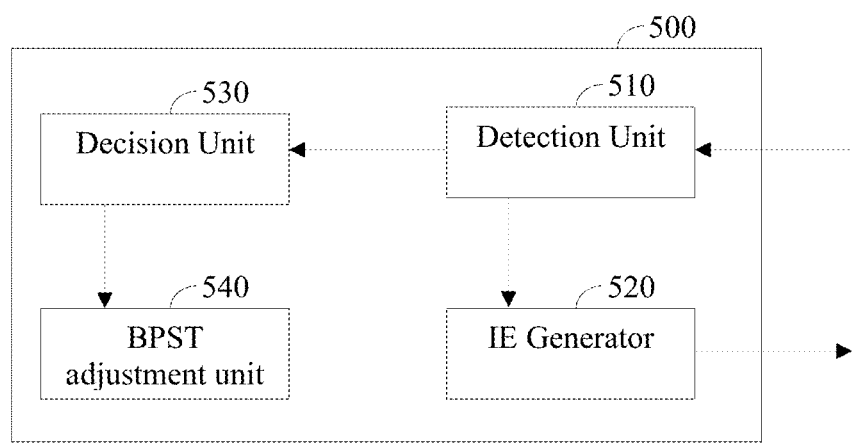
FIG. 5 is block diagram of a network device in accordance with an embodiment of the invention.

FIG. 5 shows a non-limiting block diagram of a network device 500 in accordance with an embodiment of the invention. The network device 500 includes a detection unit 510, an information element (IE) generator 520, a decision unit 530, and a BPST adjustment unit 540. The detection unit 510 discovers alien group of devices operable in one or more alien wireless networks. The alien network overlaps with the wireless network in which the network device is operable. As discussed in detail above, the discovery is based on at least the NetID or the network address of the alien group of devices. The information element generator 520 generates an IE that includes at least a NetID or a network address of the discovered alien group of devices. The IE is sent to report the discovered alien group of devices to other network devices. The decision unit 520 determines if an adjustment is needed between a beacon period of the network device and a beacon period of the alien group of devices. If the adjustment is required, the BPST adjustment unit 540 adjusts the BPST of the network device with the BPST of the alien devices.

The teachings of the self-coexistence and beaconing device promotion procedures disclosed herein can be implemented in wireless networks including but not limited to, cognitive wireless networks, ultra-wide band (UWB) based networks, IEEE 802.11 based networks, and IEEE 802.15 based networks.

The foregoing detailed description has set forth a few of the many forms that the invention can take. It is intended that the foregoing detailed description be understood as an illustration of selected forms that the invention can take and not as a limitation to the definition of the invention. It is only the claims, including all equivalents that are intended to define the scope of this invention.

Most preferably, the principles of the invention are implemented as any combination of hardware, firmware and software. Moreover, the software is preferably implemented as an application program tangibly embodied on a program storage unit or computer readable medium. One of ordinary skilled in the art would recognize that a "machine readable medium" is a medium capable of storing data and can be in a form of a digital circuit, an analogy circuit or combination thereof. The application program may be uploaded to, and executed by, a machine comprising any suitable architecture. Preferably, the machine is implemented on a computer platform having hardware such as one or more central processing units ("CPUs"), a memory, and input/output interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown. In addition, various other peripheral units may be connected to the computer platform such as an additional data storage unit and a printing unit.

What is claimed is:

1. A method for enabling self-coexistence of devices in a flexible wireless system that includes a first wireless network and a second wireless network, wherein the first wireless network and the second wireless network share a frequency band, the method comprising:
    discovering, at a discovering device in the first wireless network, a second device operable in the second wireless network that overlaps with the first wireless network;
    reporting, by the discovering device, an identification of the discovered second network to one or more devices operable in the first wireless network;
    determining whether a difference exists between a first beacon period of the first network and a second beacon period of the second network; and
    adjusting a beacon period start time (BPST) of selected devices in the first network and/or in the second network when the difference is detected;
    wherein reporting the second network to the devices of the first network comprises:
        reporting the identification of the second wireless network in a beacon period of a superframe of the discovering device when the discovering device is a beaconing device; and
        reporting the identification of the second wireless network in a signaling window of the superframe of the discovering device when the discovering device is a non-beaconing device;
    wherein when the difference is detected, the method comprises determining whether each device in the first wireless network should join a group that includes devices that should not adjust their BPST based on at least a configuration of the flexible wireless system.

2. The method of claim 1, wherein the first wireless network has a first network identifier (NetID) of a Flex-MAC protocol, and wherein the detection circuit detects the second network device operable in the second wireless network by determining that a beacon received from the second device includes a second NetID of the Flex-MAC protocol that differs from the first NetID.

3. The method of claim 2, wherein reporting the discovered second device comprises reporting an information element (IE) that includes the NetID of the second wireless network.

4. The method of claim 1, wherein a configuration of the first wireless network and the second wireless network comprises one of distributed-distributed, centralized-distributed, distributed-centralized, and centralized-centralized.

5. The method of claim 4, wherein when the configuration of the flexible wireless system is distributed-distributed, the group is defined to include devices having a largest number of reserved slots, a largest beacon period length, or a largest superframe number.

6. The method of claim 4, wherein when the configuration of the flexible wireless system is centralized-centralized, the group is defined to include a master device with a largest number of slave devices with active reservations or a master device with a largest number of reserved slots, and wherein when such master device is not found, including in the group devices with a largest overall number of reserved slots, a largest beacon period length, or a largest superframe number.

7. The method of claim 4, wherein when the configuration of the flexible wireless system is centralized-distributed or distributed-centralized, the group is defined to include at least one slave device operating in a centralized mode with active reservation, and wherein when such slave device is not found, including in the group devices with a largest overall number of reserved slots, a largest beacon period length, or a largest superframe number.

8. The method of claim 1, wherein devices that are not included in the group are added to another group, wherein the devices in the another group adjust their BPST.

9. The method of claim 1, wherein adjusting the BPST of a select device further comprises:
    determining whether the select device is a master device;
    setting a beacon slot number of the select device to a new beacon slot number when the select device is not a master device; and
    adjusting the select BPST of the select device and its slave device to a new BPST when the select device is a master device.

10. The method of claim 9, wherein adjusting the first BPST of the first device and its slave device to a new BPST further comprises:
    setting the new BPST value by the master device;
    reporting to the slave device the new BPST value using a beacon;
    starting a timer to count a time for switching to the new BPST; and
    switching to the new BPST upon receiving an acknowledgment (ACK) message from each slave device, or when the timer expires.

11. The method of claim 1, further comprising promoting, by a master device, a non-beaconing discovering device to function as a beaconing device.

12. The method of claim 11, wherein promoting the non-beaconing discovering device is performed when: a promotion request is received by the master device; or the discovered second device belongs to a newly discovered group that includes devices that are neighbors of the non-beaconing discovering device but not of other beaconing devices in a network.

13. A method for enabling self-coexistence of devices in a flexible wireless system that includes first and second wireless networks sharing a frequency band, the method comprising:
    discovering a second device operable in the second wireless network that overlaps with the first wireless network;
    reporting an identifier of the discovered second wireless network to each device operable in the first wireless network;
    determining whether a difference exists between a first beacon period of the first wireless network and a second beacon period of the second wireless network;
    adjusting a beacon period start time (BPST) of at least one select device in the first network or the second network when the difference exists;
    wherein when the difference is detected, the method comprises determining whether each device in the first wireless network should join a group that includes devices that should not adjust their BPST based on at least a configuration of the flexible wireless system; and setting a beacon slot number of the select device to a new beacon slot number when the select device is not a master device;

wherein setting the beacon slot number to the new beacon slot number comprises computing the new beacon slot number by adding to an old beacon slot number a highest occupied beacon slot number plus one and subtracting a signal slot count; and wherein the number of the highest occupied beacon slot is indicated in a received beacon and the signal slot count is a number of signaling slots in a superframe.

14. A network device operable in self-coexistence with network devices in a flexible wireless system that includes a first wireless network and a second wireless network, wherein the first wireless network and the second wireless network share a frequency band, the network device comprising:

a detection circuit that detects a second network device operable in the second wireless network that overlaps with the first wireless network;

an information element generator circuit that reports an identifier of the discovered second wireless network to other network devices in the first wireless network;

a decision circuit that determines when a difference exists between a beacon period of the first wireless network and a second beacon period of the second wireless network;

wherein when the difference is detected, the decision circuit determines whether the network device should join a group that includes devices that should not adjust their beacon period start time (BPST) based on at least a configuration of the flexible wireless system, and a (BPST) BPST adjustment circuit that adjusts a BPST of the network device to a new BPST when a difference is detected and the network device is not included in the group that should not adjust their BPST;

wherein the information element generator reporting circuit reports the identification of the second wireless network in the first beacon period of the network device when the network device is a beaconing device; and wherein the information element generator reporting circuit reports the identification of the second wireless network in a signaling window of the network device when the network device is a non-beaconing device.

15. The network device of claim 14, wherein the first wireless network has a first network identifier (NetID) of a Flex-MAC protocol, and wherein the detection circuit detects the second network device operable in the second wireless network by determining that a beacon received from the second device includes a second NetID of the Flex-MAC protocol that differs from the first NetID.

16. The network device of claim 14, wherein when the difference exists, the method comprises determining whether each device in the first wireless network should join a group that includes devices that should not adjust their BPST based on at least a configuration of the flexible wireless system.

17. The network device of claim 16, wherein devices that are not included in the group are added to another group, wherein the devices in the another group adjust their BPST.

18. The network device of claim 14, wherein adjusting the BPST further comprises:

determining whether the network device is a master device;

setting a beacon slot number of the network device to a new beacon slot number when the network device is not a master device; and adjusting the BPST of the network device and its slave device to a new BPST when the network device is a master device.

19. The network device of claim 14, wherein adjusting the BPST of the network device and its slave device to the new BPST further comprises:

setting the new BPST value by the master device;

reporting to the slave device the new BPST value using a beacon;

starting a timer to count a time for switching to the new BPST; and switching to the new BPST upon receiving an acknowledgment (ACK) message from each slave device, or when the timer expires.

* * * * *